(12) United States Patent
Canals Pou et al.

(10) Patent No.: US 12,251,877 B2
(45) Date of Patent: Mar. 18, 2025

(54) DETERMINING RESPECTIVE POSITIONS FOR ELONGATE MEMBERS

(71) Applicant: HEWLETT-PACKARD DEVELOPMENT COMPANY, L.P., Spring, TX (US)

(72) Inventors: Alberto Maria Canals Pou, Sant Cugat del Valles (ES); Marc Casalprim Torres, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 399 days.

(21) Appl. No.: 17/588,534

(22) Filed: Jan. 31, 2022

(65) Prior Publication Data

US 2023/0241839 A1 Aug. 3, 2023

(51) Int. Cl.
| | |
|---|---|
| B29C 64/386 | (2017.01) |
| B29C 64/393 | (2017.01) |
| B33Y 10/00 | (2015.01) |
| B33Y 30/00 | (2015.01) |
| B33Y 50/00 | (2015.01) |
| B33Y 50/02 | (2015.01) |

(52) U.S. Cl.
CPC .......... *B29C 64/386* (2017.08); *B29C 64/393* (2017.08); *B33Y 10/00* (2014.12); *B33Y 30/00* (2014.12); *B33Y 50/00* (2014.12); *B33Y 50/02* (2014.12)

(58) Field of Classification Search
CPC ..... B29C 64/386; B29C 64/393; B29C 64/40; B29C 64/188; B33Y 30/00; B33Y 50/00; B33Y 50/02
See application file for complete search history.

(56) References Cited

U.S. PATENT DOCUMENTS

| | | | | |
|---|---|---|---|---|
| 10,265,911 B1* | 4/2019 | Capri | ..................... | G06T 7/001 |
| 10,994,490 B1* | 5/2021 | Matusik | .................. | B22F 12/55 |
| 11,073,824 B1* | 7/2021 | Chapman | ............... | B33Y 50/00 |
| 2007/0228592 A1* | 10/2007 | Dunn | .................... | B29C 64/106 |
| | | | | 264/113 |
| 2013/0297320 A1* | 11/2013 | Buser | ..................... | G10L 15/22 |
| | | | | 704/E21.001 |
| 2017/0057170 A1* | 3/2017 | Gupta | ................. | G05B 19/4099 |
| 2018/0141685 A1* | 5/2018 | Colson | ..................... | B65B 5/02 |
| 2018/0345650 A1* | 12/2018 | Chisena | ................. | B33Y 50/02 |
| 2018/0348737 A1* | 12/2018 | Kim | ......................... | G06T 17/20 |
| 2020/0269506 A1* | 8/2020 | Macmullen | ........... | B29C 64/314 |
| 2020/0324486 A1* | 10/2020 | Mantell | ................. | B29C 64/112 |
| 2021/0276268 A1* | 9/2021 | LeStrange | ............. | B29C 64/112 |
| 2021/0354378 A1* | 11/2021 | Truong | ................. | B29C 64/176 |

* cited by examiner

Primary Examiner — Daniel Samwel
(74) Attorney, Agent, or Firm — Michael Dryja

(57) ABSTRACT

Calibration data is obtained relating to a printed thickness of an elongate member as a function of position within a container for containing a print medium in an additive manufacturing printer. An object model is obtained representing an object to be printed, the object having elongate members. A position of the object to be printed within the container is determined and respective positions within the container for the elongate members of the object are determined from the determined position of the object. The obtained object model of the object is changed to an amended object model in which the elongate members have respective thicknesses based on the determined respective positions within the container for the elongate members and the calibration data.

18 Claims, 9 Drawing Sheets

Thickness of strut in amended print file in mm

| y | | | | | | | | |
|---|---|---|---|---|---|---|---|---|
| 1.00 | 0.979 | 0.977 | 0.977 | 1.01 | 0.981 | 0.987 | 0.997 | 1.02 |
| 0.915 | 0.923 | 0.917 | 0.945 | 0.973 | 0.968 | 0.955 | 0.958 | 0.981 |
| 0.951 | 0.943 | 0.941 | 0.959 | 0.962 | 0.976 | 0.974 | 0.964 | 0.976 |
| 0.982 | 0.947 | 0.963 | 0.986 | 0.99 | 0.997 | 0.987 | 0.969 | 1.00 |
| 0.98 | 0.97 | 1.00 | 0.999 | 1.02 | 0.985 | 1.02 | 1.01 | 1.04 |
| 1.03 | 1.03 | 1.04 | 1.06 | 1.04 | 1.05 | 1.06 | 1.07 | 1.09 | x

Figure 4

DETERMINING RESPECTIVE POSITIONS FOR ELONGATE MEMBERS

BACKGROUND

Additive manufacturing processes can produce three-dimensional objects by solidifying and unifying successive layers of build material in cross-sectional patterns of the three-dimensional objects according to computer models.

A three-dimensional object to be generated may be represented digitally by a computer model. The digital representation of a three-dimensional object may be processed before being used to generate the object. Structural and decorative properties of three-dimensional objects built in additive manufacturing processes may be controllable and may depend on the process and materials used.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 4 is a table that illustrates the thickness of a strut in an amended print file as a function of position in an x-y plane in an example;

DETAILED DESCRIPTION

Figure 1:
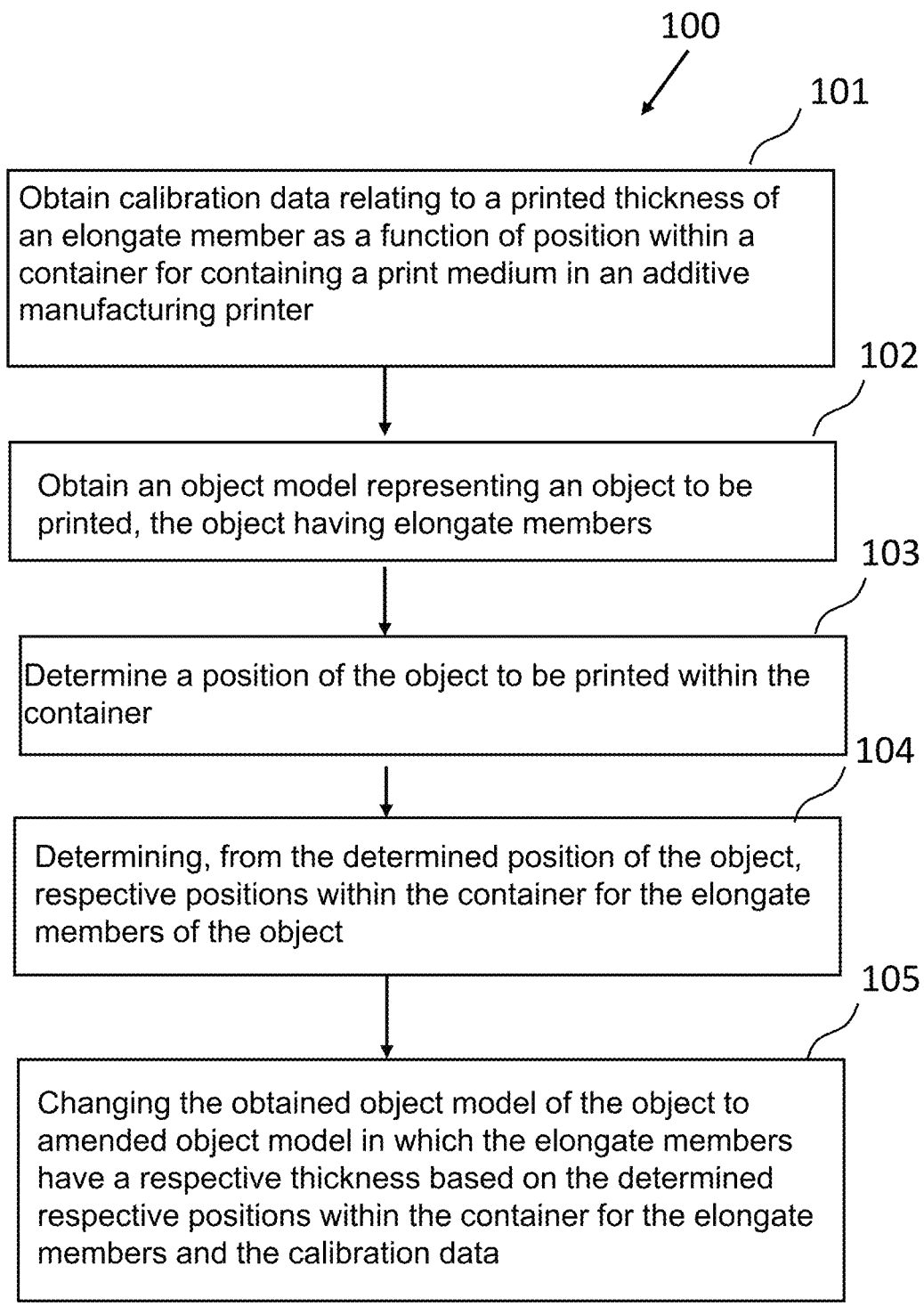
FIG. 1 is a flow chart of a method according to an example.

Additive manufacturing systems may generate three-dimensional objects in a multitude of ways. One such way is through the selective solidification of portions of successive layers of build material. Some such systems may solidify these portions of build material by selectively depositing agents to the portions to be solidified. Some systems use liquid energy-absorbing agents, or fusing agents, that cause build material to heat up, melt, and then solidify (upon cooling) when suitable energy, such as infra-red energy, is applied. Other systems may use liquid binder agents to chemically bind the selected portions of build material. By performing these processes on successive layers of build material, three-dimensional objects may be generated layer-by-layer.

Other additive manufacturing systems employ different techniques to generate three-dimensional objects. These include fused deposition model (FDM) systems, selective laser sintering (SLS) systems, and light polymerization systems.

Generally, three-dimensional objects to be printed are represented by object models. Object models may be generated using computer-aided design (CAD) programs. Some CAD programs may also be able to generate other kinds of data to be used when printing a three-dimensional object according to an object model. CAD programs may also be used to generate settings or select desired characteristics of an object to be printed.

Some additive manufacturing systems may generate three-dimensional objects with desired physical properties by using an appropriate print process. As discussed above, some additive manufacturing systems generate three-dimensional objects by depositing and selectively solidifying portions of successive layers of build material. The print process in these additive manufacturing processes may be controlled by applying agents to selected portions of build material to achieve a desired property. For example, coloring agents, detailing agents, or conductive agents may be applied to achieve the desired properties of the selected portions build material when solidified.

The temporary application of energy may cause portions of build material on which a fusing agent has been applied, or to which a fusing agent has penetrated, to heat up above the melting point of the build material and to fuse. Upon cooling, the fused portions solidify and form part of the three-dimensional object. Detailing agents may control the degree to which the selected portions of build material solidify and/or unify. In some cases, a process of applying energy to the build material may be controlled, such as by increasing or decreasing the power of heating elements which are applying energy to the build material. The time for which energy is applied to the build material may be increased or decreased.

Objects to be printed by an additive manufacturing process may have elongate members, such as struts of a lattice or other elongate features such as projections from the object. It has been found that dimensions of the elongate members, such as their thickness, may vary in a printed object from that intended in an object model as defined in print data, due to variations of various conditions across a container of the print medium, that is to say within a build volume. The conditions may be, for example, temperature and/or concentration of chemical agents, such as fusing agents and detailing agents. The conditions may be adjusted to be at least approximately uniform across the container to minimize any deviation from the intended dimensions of the printed object, but some variation of the dimensions of the elongate members may nevertheless be found.

According to some present examples, a method is provided as illustrated by FIG. 1 as flow diagram 100.

At block 101, calibration data is obtained, relating to a printed thickness of an elongate member as a function of position within a container for containing a print medium in an additive manufacturing printer, which may be referred to as a print engine. The position within the container may be expressed as a position within a three-dimensional build volume. The calibration data may be obtained, for example, from a data file holding previously calculated calibration data. The calibration data may relate to a printed thickness of an elongate member of at least one test piece.

In an example, obtaining the calibration data comprises obtaining data generated by printing a plurality of test pieces, the plurality of test pieces being printed a various positions within a build volume. The test pieces have elongate members, for example struts of a lattice structure. In an example, respective values of a property are obtained of the plurality of printed test pieces, for example the weight, stiffness and/or compression strength of the plurality of printed test pieces. In the example of the property being weight, the value of the property may be obtained by weighing the printed test pieces, and in the examples of the property being stiffness or compression strength, the value of the property may be determined by mechanical testing techniques The test pieces, and correspondingly their respective positions within the build volume, may be identifiable by an identifier mark, such as a number or other identifying mark. The position in the build volume at which a test piece is printed is available from the print data used to print the test pieces, and may be used to generate data relating the measured value of the property, for example the weight to the position within the print volume.

Respective thicknesses of the elongate members may be determined according to the respective values of the properties, for example weights, of the test pieces. For example, the test pieces may be to a common design, having a lattice structure with struts of a given thickness, for example 1 mm. The thickness may be specified as a linear dimension between opposing sides of a cross-section of a strut. In examples, the cross-section may be square, rectangular, circular, or any other shape in cross-section. The linear dimension may be determined from the respective values of the properties on the basis of a function relating the linear dimension to the value of the property of the test piece, for example a square function or a linear approximation.

Figure 2:
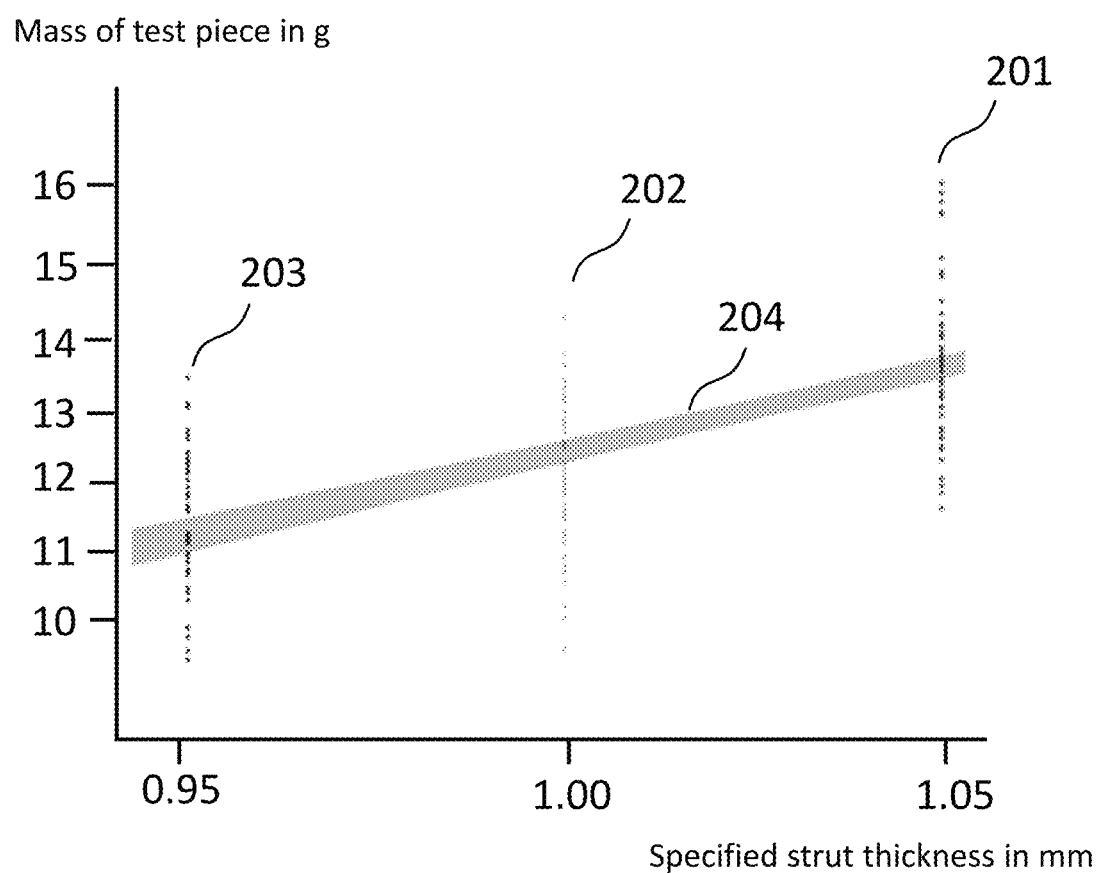
FIG. 2 is a graph illustrating spread of measured weights of test pieces having elongate members of three specified thicknesses according to an example.

FIG. 2 is a graph illustrating an example in which the measured property of the test pieces is weight, and the graph illustrates a spread of measured weights of test pieces having elongate members of three specified thicknesses according to an example. Data points at 201 show a spread of masses, as indicated by weight, of test pieces printed with a specified strut thickness of 1.05 mm. The test pieces are printed at a variety of positions within the build volume. Data points at 202 and 203 show equivalent results for specified strut thicknesses of 1.00 mm and 0.95 mm respectively. The line 204 shows an example of a linear approximation of the relationship between weight and specified strut thickness. This approximation may be obtained, for example, by a least mean squares fit to the data points 201, 202 and 203. The determined relationship between weight and specified thickness may be used to derive correction data that relates a dimension of an elongate member of a test piece as a function of position within the build volume. For example, respective linear approximations may be made of the relationship between weight and specified strut thickness for different respective positions within the container. The relationship between measured weight and specified strut thickness may depend on the position of the test piece within the container.

Figure 3:
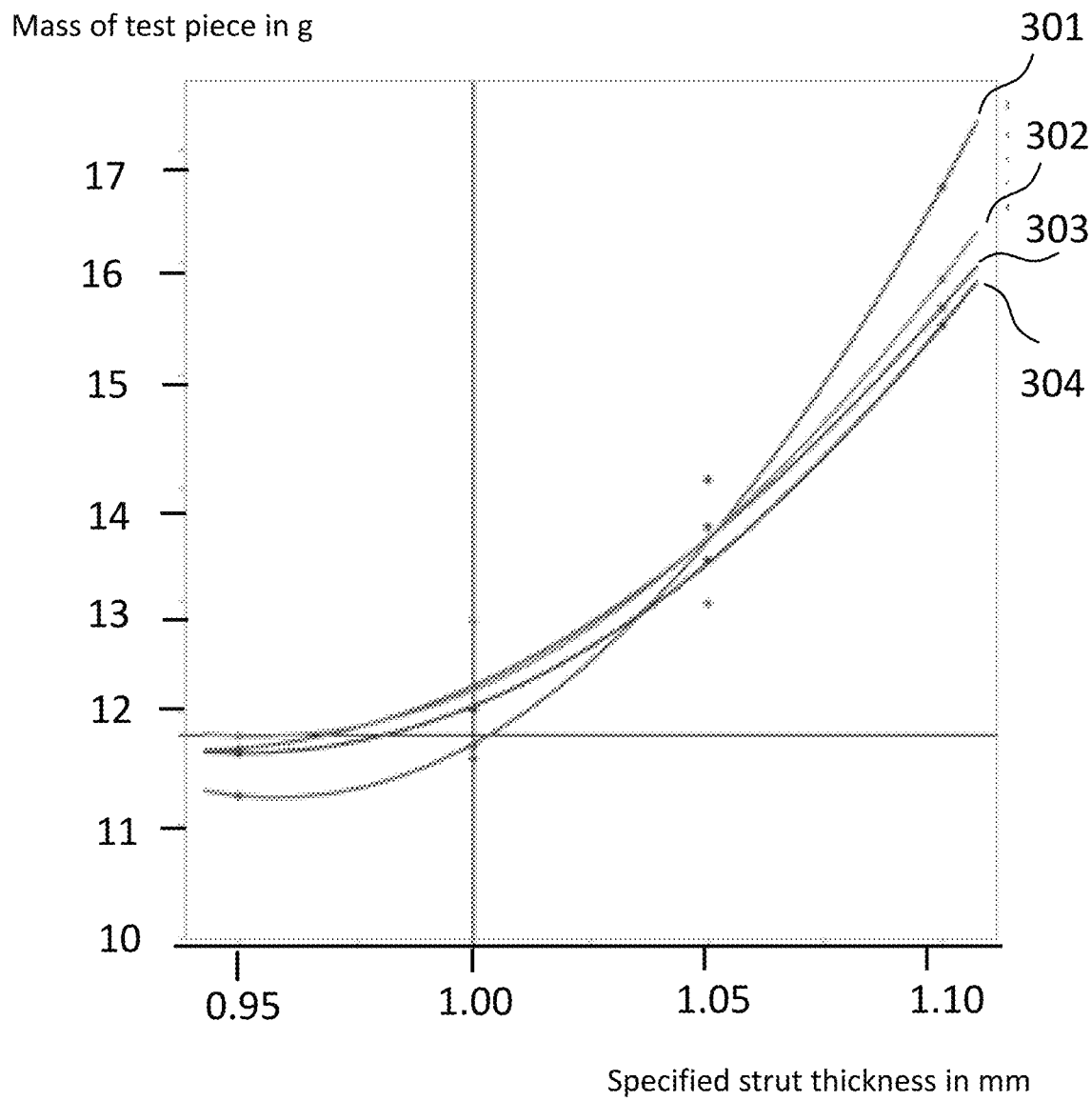
FIG. 3 is a graph illustrating relationships between weight and thickness of elongate members at four positions in a print container according to an example.

FIG. 3 is a graph illustrating relationships between weight and thickness of elongate members at four positions in a print container according to an example. The curves 301, 302, 303 and 304 are derived by fitting, in this example, a square function to data points relating mass of a test piece to the specified thickness of the test piece for four different positions within the build volume. The data shown in FIG. 3 may be used to derive correction data that relates a thickness of an elongate member of a test piece as a function of position within the build volume.

In an example, the thickness of elongate members of at least one test piece may be measured directly as a linear dimension, instead of indirectly by weighing the test piece, for elongate members at different positions within the build volume. By this means, a single test piece may be used, which may use the same object print file as the object to be printed. The object print file comprises object model data and may also provide additional information. For example, the object print file may identify a position and/or an orientation of an object when it is printed within a build volume of the additive manufacturing system.

Returning to FIG. 1, at block 102, an object model is obtained representing an object to be printed, the object having elongate members.

At block 103, a position is determined of the object to be printed within the container, that is to say a position within the build volume. In an example, the position within the container may be determined by obtaining data relating to the position within the container included in input image data, which may be already specified. In another example, the position of the object within the container may be determined by a nesting process by which several objects are positioned within the container, for example making efficient use of space.

At block 104, from the determined position of the object, respective positions within the container for the elongate members of the object are determined, for example by applying a coordinate transformation to data representing the object model.

At block 105, the obtained object model of the object is changed to an amended object model in which elongate members have a respective thickness based on the determined respective positions within the container for the elongate members and the calibration data. The respective thicknesses of the elongate members of an object may differ within an object. Furthermore, a strut may have a thickness that varies along its length, as a function of the position within the container.

The respective thicknesses of the elongate members for print data for the object may be determined to adjust the specified thickness of the elongate members of the object to be printed to compensate for the variation in the thickness of the elongate members from the specified thickness according to the position in the build volume, using the calibration data to generate an amended print file.

FIG. 4 illustrates an example of thickness of a strut in an amended object model in an amended print file as a function of position in an x-y plane within a build volume. Two dimensions are illustrated for clarity. In a practical example the data would subsist across three dimensions corresponding to the three dimensions of the respective build volume. In examples, the thickness of a strut in an amended print file may be given as a function of position in three dimensions (x, y and z) within a build volume. FIG. 4 gives an example of design modification data, in the form of thicknesses to be specified in an amended print file. In the example of FIG. 4, amended thicknesses are shown to give a strut thickness of 1 mm in a printed object. The design modification data may comprise scaling factors to be applied to the thicknesses of the struts. In an example, the obtained calibration data may comprise the design modification data, and/or the design modification data may be obtained by processing data contained in the calibration data.

A wire frame representation of an object to be printed, having non-volumetric members representing the elongate members of the object, may be used as object model data, and the wire frame representation may be amended to include the dimensions of the elongate members, such as the thicknesses of the lattice struts, in the print data to be used for printing. The amendment of the wire frame representation may be achieved, for example, by applying the design modification data. The linear dimensions in the design modification data may have an inverse relationship to components of the calibration data, that is to say the design modification data compensates specified dimensions to correct for the variations of the dimensions with position in the build volume. In an example, the design modification data comprises thicknesses to be used in the amended object model.

In an example, the elongate members of the obtained object model are defined with a unit thickness. The unit thickness may be a nominal thickness, which is to be amended by the design modification data.

Figure 5A:
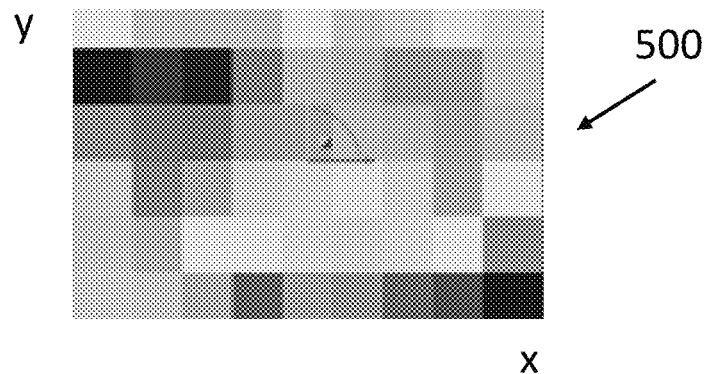
FIGS. 5a, 5b and 5c are greyscale images that illustrate interpolation between measured points to produce calibration data in examples.
Figure 5B:
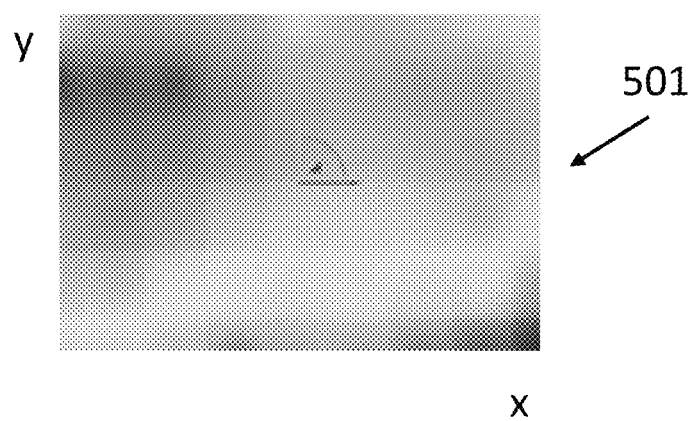
Figure 5C:
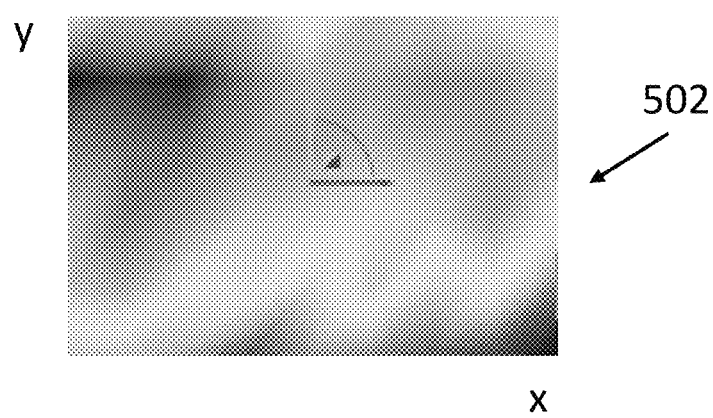

FIGS. 5a, 5b and 5c illustrate the use of interpolation between values in the design modification data. FIG. 5a illustrates a nearest neighbor interpolation, FIG. 5b illustrates a so-called natural interpolation and FIG. 5c illustrates a barycentric interpolation. FIGS. 5a, 5b and 5c illustrate interpolated values of the data of FIG. 4, illustrated as greyscale values. As was the case for FIG. 4, a two-dimensional representation is shown for clarity. Examples of design modification data may be generated using interpolation in three dimensions and, in a practical example, the values would subsist across three dimensions corresponding to the three dimensions of the respective build volume.

Figure 6:
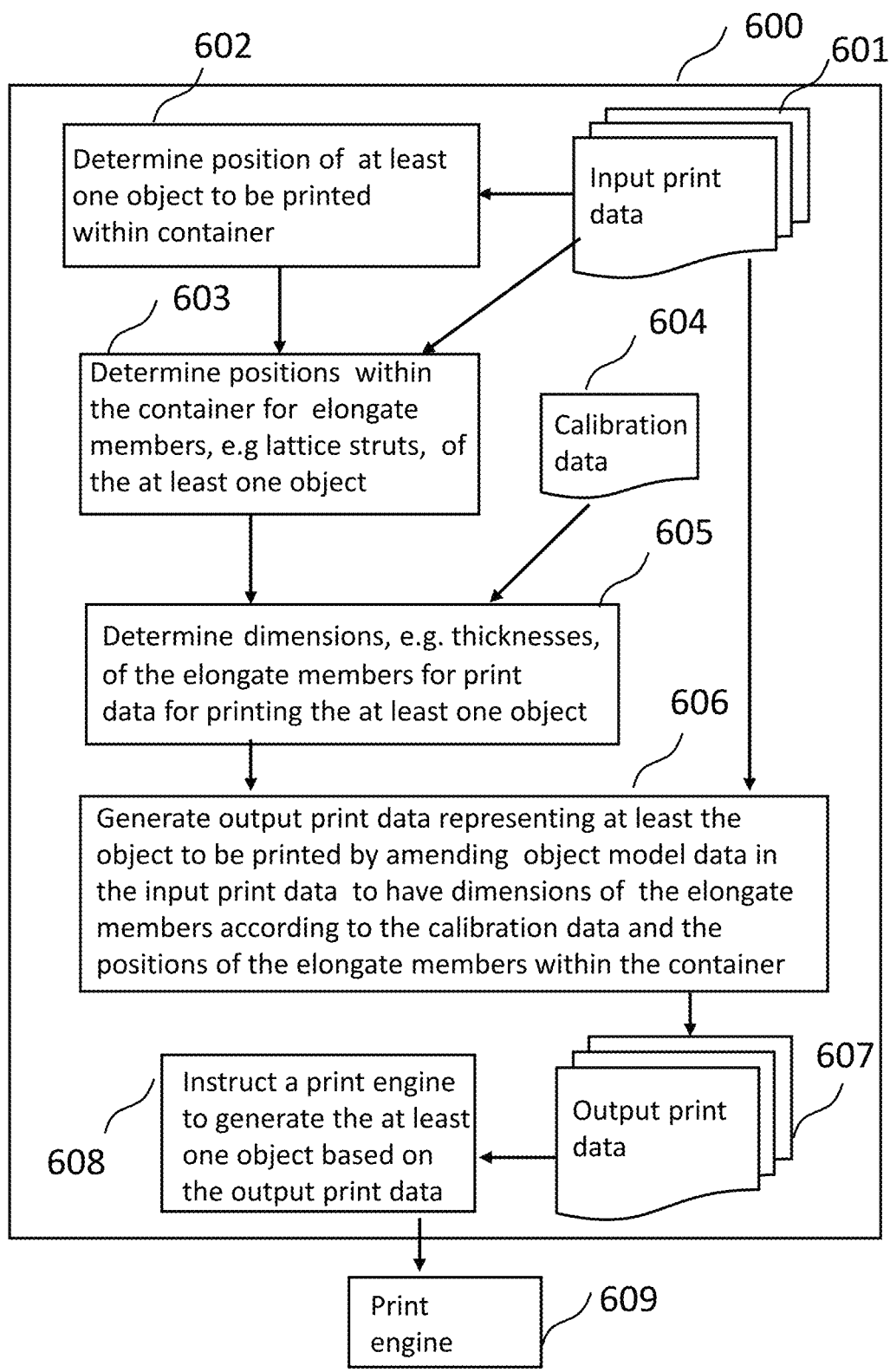
FIG. 6 is a schematic diagram of a workflow according to an example.

FIG. 6 is a schematic diagram of a workflow according to an example. A workflow 600 is shown that takes, as input inputs, input print data 601 and calibration data 604, produces output print data 607 and instructs a print engine 609 to generate at least one object based on the output print data. The calibration data 604 relates to a dimension of an elongate member of at least one test piece as a function of position within a container for containing a print medium in an additive manufacturing printer, as previously described.

The input print data 601 may be received from a local computer. Alternatively, the input print data 601 may be received over a wide area network from a computer, for example over the internet. A user of an additive manufacturing system may design an object model of and object to be printed in the additive manufacturing process using a program or application. The user may then send input print data to the additive manufacturing system. Input print data 601 may be in 3D Manufacturing Format (3MF), although other formats may also be used, for example STL, OBJ and any other format. Formats used for input print data 601 may provide more data than just the object model data. For example, input print data may also identify a position and/or an orientation of an object when it is printed within a build volume of an additive manufacturing system.

An object may be represented in object model data as geometric coordinates of vertices and/or edges of surface polygons which define the surface of the object. For example, the object may be represented by a plurality of triangles joined together and formed to approximate a surface of the three-dimensional object. The coordinates may be stored in the object model data. This representation of the object may also be referred to as a mesh.

Object property data may be generated when generating the object model data. For example, a user, or application, which designs and/or generates the object model data may also identify a region of the object which is to be printed.

In some examples, the input image data comprises print job data. The print job data may identify a position at which the at least one object is to be generated by the print engine. A print job may be considered a unit of work comprising printing one or more objects based on output print data. For example, in a multiple agent additive manufacturing system a print job may be defined as a print process which fills a build volume of the multiple agent manufacturing system by generating one or more objects. When the build volume is full the print job is ended, and the build volume is emptied, or replaced with an empty build volume, so that another print job can be performed.

Print job data at least defines the position in the build volume at which the at least one object may be generated. The print job data may define the position at which each object to be printed in a corresponding print job will be printed with respect to the build volume. Alternatively, or additionally, the print job data may define the relative positions of multiple objects which are to be printed in the print job.

Print job data may define settings to be used for a corresponding print job. Settings may include any parameters which can affect a print process for generating three-dimensional objects. Some examples of settings include, which agents to apply to selected portions of build material, a specified method of heating build material, an indication of which build materials to use for particular portions of an object to be generated, and any other parameter which may affect the print job. As discussed above 3MF files may be used for input print data, whereby 3MF files may comprise object model data, object property data, and print job data.

As shown in FIG. 6, output print data 607 is produced in the workflow 600. The output print data 607 may be in the same format as the input print data 601, for example in 3MF or other format, to instruct the print engine 609 to generate at least one object based on the output print data 607.

The print engine 609 comprises parts of an additive manufacturing system which are responsible for generating the at least one object to be printed using associated output print data. The precise components of the print engine depend on the type of additive manufacturing system in which the examples described herein are implemented.

In an example, a print engine 609 is a multiple agent additive manufacturing system which fuses and unifies selected portions of successive layers of build material by the selective application of agents and application of suitable energy. However, the examples described herein are not limited to such a system. A print engine in a multiple agent additive manufacturing system comprises at least: a build volume in which successive layers of build material are deposited; one or more agent depositors to selectively apply, or deposit, agents on the successive layers of build material; one or more energy sources arranged to apply a suitable amount of energy to the build material to cause the fusing of selected portions of build material, on which suitable agents have been deposited; and a controller for controlling the other components in the print engine to generate three-dimensional objects according to output print data.

At block 602, the position within a container of print medium, that is to say within a build volume, is determined of at least one object to be printed. The position may be determined by performing a nesting operation on in which several objects to be printed are arranged within the build volume, or the position may be determined by reading data in the input print data that already specifies the position in the build volume.

At block 603, positions are determined within the container for elongate members, for example struts of a lattice, of the at least one object to be printed, for example by a coordinate transformation from coordinates within the print data for the object to coordinates of the positions of the elongate members within the build volume. In an example, the positions within the container are determined from an object model in the form of a wire frame representation of the object, as already mentioned, in which the elongate members, for example struts, are represented by connecting lines without a defined thickness. In another example, the positions within the container are determined from an object model in the form of a volumetric representation of the object, in which the elongate members have a defined thickness, for example a nominal unit thickness.

At block 605, the calibration data 604, which relates to a dimension of an elongate member of at least one test piece as a function of position within the container, is used to determine dimensions, for example thicknesses, of the elongate members for print data for printing the at least one object. In the example of an object model in the form of a wire frame representation of the object, this may be achieved by using at least parts of the calibration data to generate design modification data indicating applied thicknesses of the elongate member to be applied as a volumetric model in a print data file to compensate for the effects of variation of the dimension as shown by the calibration data. In an example, the applied thicknesses are the inverse of the respective factors in the calibration data. In the example of an object model in the form of a volumetric representation of the object, at least parts of the calibration data may be used to generate design modification data indicating scale factors to be applied to a dimension, for example thickness, of the elongate member in a print data file to compensate for the effects of variation of the dimension as shown by the calibration data. In an example, the scale factors are the inverse of the respective factors in the calibration data. The calibration data, and/or the design modification data, may be generated by interpolation between values derived my measurements of test pieces built at various positions within the build volume. In an example, the obtained calibration data may comprise the design modification data.

At block 606, output print data is generated representing the at least one object to be printed, by amending the object model data contained in the input print data to have dimensions of the elongate members according to the calibration data and the positions of the elongate members within the container, to produce output print data 607. Amending the object model data may be achieved, in an example, by applying design modification data derived from, or contained in, the calibration data as a field function to the object model data.

At block 608, the print engine 609 is instructed to generate the at least one object based on the output print data 607.

Figure 7:
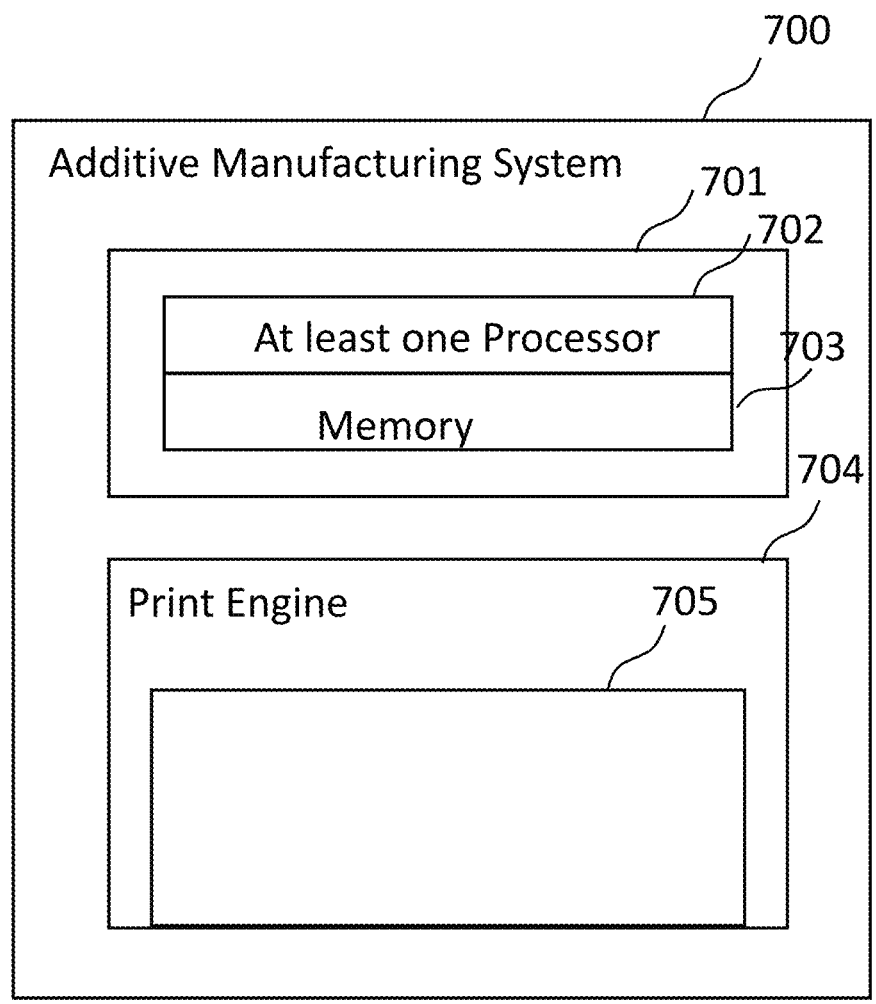
FIG. 7 is a schematic diagram of an additive manufacturing system according to an example.

FIG. 7 shows schematically an additive manufacturing system 700 according to an example. The additive manufacturing system 700 comprises a print engine 704 for printing at least one object based on output print data. The print engine comprises a build volume 705 within which the objects to be printed are printed during a print process. The components of the print engine which are used to generate the objects during a print process are dependent on the type of additive manufacturing which is used. Examples of components in multiple agent additive manufacturing print engine are described above with reference to a multiple agent additive manufacturing system.

The additive manufacturing system 700 comprises at least one controller 701 to process input print data and to control the print engine to print the at least one object. The at least one controller comprises at least one processor 702 and at least one non-transitory computer-readable storage medium, which may be referred to as a memory, 703. The at least one non-transitory computer-readable storage medium stores computer program code that, when executed by the processor causes the processor to perform a method as described herein and as illustrated by the flow diagram of FIG. 1 and the work flow diagram of FIG. 6, and the associated description.

Figure 8:
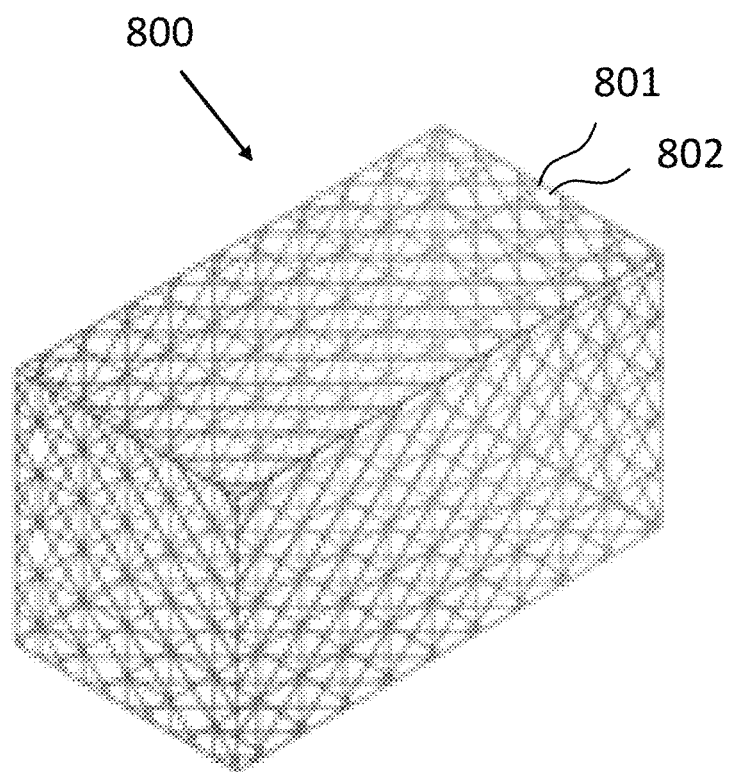
FIG. 8 illustrates an isometric graphical representation of input image data according to an example.

FIG. 8 illustrates a graphical representation of input image data according to an example, representing an object 800 having a lattice structure comprising a plurality of nodes 801 interconnected by a plurality of struts 802, which may be referred to as beams. In the example of FIG. 8, the nodes are arranged in a rectangular grid within a defined volume of the object to be printed, and the nodes are connected by an arrangement of struts disposed in a rectangular pattern, interconnecting adjacent nodes, and further struts are provided in a diagonal configuration to provide further strength to the structure. In other examples, the nodes and struts may be disposed in other geometrical arrangements. The object 800 represented by FIG. 8 is shown as a cuboid to clearly show the lattice structure, but other shapes may be represented, such as test pieces for obtaining calibration data, or objects to be manufactured once calibration data is obtained.

Figure 9:
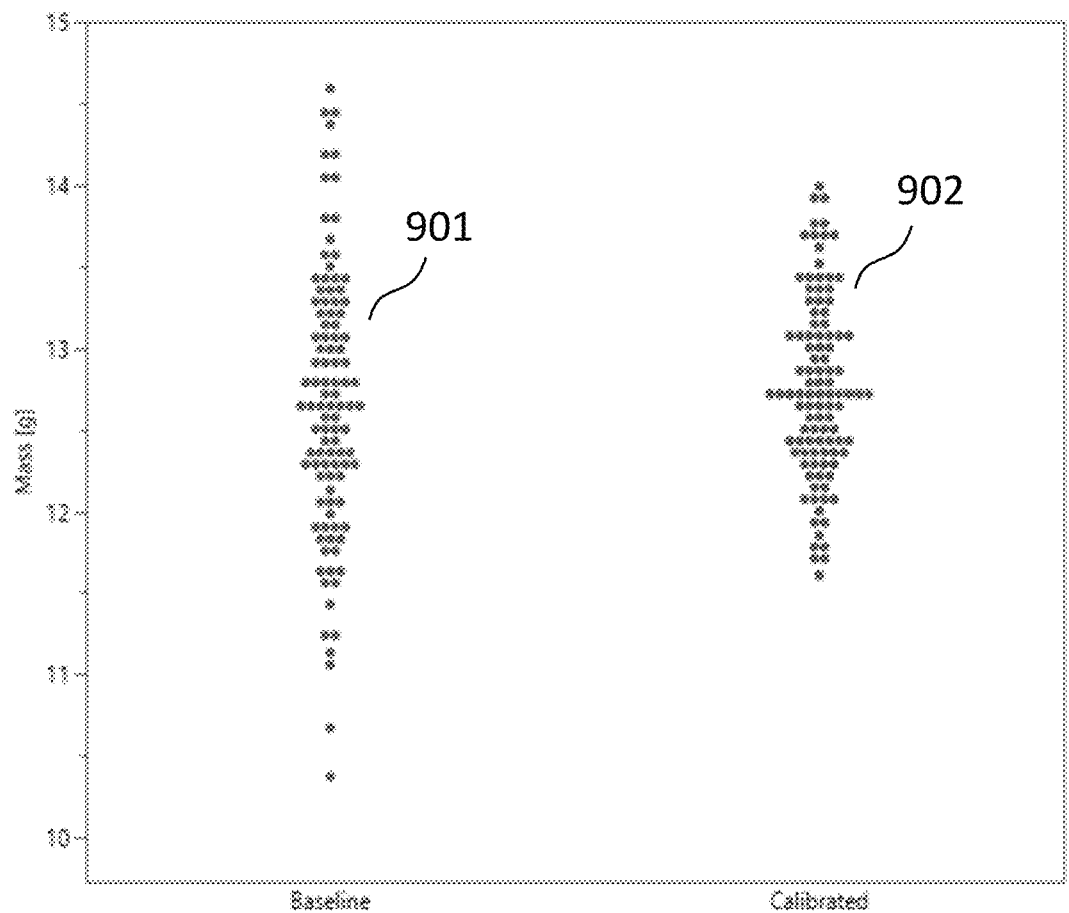
FIG. 9 illustrates a spread of measured weights of test pieces having elongate members of a specified thickness in an example.

FIG. 9 illustrates an example of a spread of measured masses, determined by weighing, of test pieces having elongate members of a specified thickness. At 902, masses of test pieces are shown in which calibration data is used to determine the dimensions, in print data, of the elongate members of the test pieces according to a position in a container for print medium according to the method of FIG. 1. At 901, masses of test pieces are shown in which the dimensions, in print data, of the elongate members of the test pieces are not adjusted according to a position in the container for print medium. It can be seen that a reduced spread is shown when the calibration data is used to determine dimensions of elongate members of an object to be printed.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
obtaining, by a processor, calibration data relating to performance of a lattice structure comprising a plurality of elongate members as a function of a printed thickness of each elongate member and a position of each elongate member within a fabrication chamber of an additive manufacturing apparatus within which the lattice structure is printed;
obtaining, by the processor, an object model representing an object to be printed, the object having elongate members;
determining, by the processor, a position of the object at which the object is to be printed within the fabrication chamber;
determining, by the processor and based on the determined position of the object at which the object is to be printed within the fabrication chamber, respective positions at which the elongate members of the object are to be printed within the fabrication chamber;
modifying, by the processor, the object model such that the elongate members of the object have respective thicknesses according to the calibration data for the respective positions at which the elongate members of the object are to be printed within the fabrication chamber to yield a specified performance of the object; and causing the object to be printed at the determined position in the fabrication chamber of the additive manufacturing apparatus in accordance with the modified object model, such that the elongate members have the respective thicknesses when printed.

2. The method of claim 1, further comprising:

generating output print data representing at least the object to be printed based on the modified object model.

3. The method of claim 2, wherein causing the object to be printed at the determined position in the fabrication chamber in accordance with the modified object model comprising instructing a print engine to generate the object based on the output print data.

4. The method of claim 1, wherein the elongate members of the object model are defined with a unit thickness.

5. The method of claim 1, wherein the object model represents a wire frame model of the object having non-volumetric members representing the elongate members of the object.

6. The method of claim 5, wherein determining the position of the object at which the object is to be printed within the fabrication chamber comprises determining the position of the object in relation to other objects to be printed within the fabrication chamber based on the wire frame model of the object.

7. The method of claim 1, wherein the object to be printed has a lattice structure and the elongate members are struts of the lattice structure.

8. The method of claim 1, wherein obtaining the calibration data comprises:

printing a plurality of test pieces of the lattice structure;

determining respective values of a property of the plurality of printed test pieces; and determining respective thicknesses of the elongate members according to the respective values of the property of the test pieces.

9. The method of claim 8, wherein the property is selected from weight, stiffness, and compression strength.

10. A non-transitory computer-readable storage medium storing instructions executable by a processor to perform processing comprising:

obtaining calibration data relating to performance of a lattice structure comprising a plurality of elongate members as a function of a printed thickness of each elongate member and a position of each elongate member within a fabrication chamber of an additive manufacturing apparatus within which the lattice structure is printed;

obtaining an object model representing an object to be printed, the object having elongate members;

determining a position of the object at which the object is to be printed within the fabrication chamber;

determining, based on the determined position of the object at which the object is to be printed within the fabrication chamber, respective positions at which the elongate members of the object are to be printed within the fabrication chamber;

modifying the object model such that the elongate members of the object have respective thicknesses according to the calibration data for the respective positions at which the elongate members of the object are to be printed within the fabrication chamber to yield a specified performance of the object; and causing the object to be printed at the determined position in the fabrication chamber of the additive manufacturing apparatus in accordance with the modified object model, such that the elongate members have the respective thicknesses when printed.

11. The non-transitory computer-readable storage medium of claim 10, wherein the processing further comprises:

generating output print data representing at least the object to be printed based on the modified object model.

12. The non-transitory computer-readable storage medium of claim 11, wherein causing the object to be printed at the determined position in the fabrication chamber in accordance with the modified object model comprises instructing a print engine to generate the object based on the output print data.

13. The non-transitory computer-readable storage medium of claim 10, wherein the elongate members of the object model are defined with a unit thickness.

14. The non-transitory computer-readable storage medium of claim 10, wherein the object model represents a wire frame model of the object having non-volumetric members representing the elongate members of the object.

15. The non-transitory computer-readable storage medium of claim 14, wherein determining the position of the object at which the object is to be printed within the fabrication chamber comprises determining the position of the object in relation to other objects to be printed within the fabrication chamber based on the wire frame model of the object.

16. The non-transitory computer-readable storage medium of claim 10, wherein the object to be printed has a lattice structure and the elongate members are struts of the lattice structure.

17. The non-transitory computer-readable storage medium of claim 10, wherein obtaining the calibration data comprises:

printing a plurality of test pieces of the lattice structure;

determining respective values of a property of the plurality of printed test pieces; and determining respective thicknesses of the elongate members according to the respective values of the property of the test pieces.

18. An additive manufacturing system comprising:

a print engine for printing one or more objects based on output print data;

a processor;

a memory storing computer program code executable by the processor to:

obtain calibration data relating to performance of a lattice structure comprising a plurality of elongate members as a function of a printed thickness of each elongate member and a position of each elongate member within a fabrication chamber of an additive manufacturing apparatus within which the lattice structure is printed;

obtain an object model representing an object to be printed, the object having elongate members;

determine a position of the object at which the object is to be printed within the fabrication chamber;

determine, based on the determined position of the object at which the object is to be printed within the fabrication chamber, respective positions at which the elongate members of the object are to be printed within the fabrication chamber;

modify the object model such that the elongate members of the object have respective thicknesses according to the calibration data for the respective positions at which the elongate members of the object are to be printed within the fabrication chamber to yield a specified performance of the object; and cause the object to be printed at the determined position in the fabrication chamber of the additive manufacturing apparatus in accordance with the modified object model, such that the elongate members have the respective thicknesses when printed.

\* \* \* \* \*